(12) United States Patent
Mayuzumi

(10) Patent No.: US 10,719,946 B2
(45) Date of Patent: Jul. 21, 2020

(54) INFORMATION PROCESSING APPARATUS, METHOD THEREOF, AND COMPUTER-READABLE STORAGE MEDIUM

(71) Applicant: CANON KABUSHIKI KAISHA, Tokyo (JP)

(72) Inventor: Ichiko Mayuzumi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/680,782

(22) Filed: Aug. 18, 2017

(65) Prior Publication Data

US 2018/0061065 A1 Mar. 1, 2018

(30) Foreign Application Priority Data

Aug. 23, 2016 (JP) ................... 2016-163038

(51) Int. Cl.
*G06K 9/00* (2006.01)
*G06T 7/292* (2017.01)
(Continued)

(52) U.S. Cl.
CPC .............. *G06T 7/292* (2017.01); *G06F 3/048* (2013.01); *G06K 9/00288* (2013.01);
(Continued)

(58) Field of Classification Search
CPC combination set(s) only.
See application file for complete search history.

(56) References Cited

U.S. PATENT DOCUMENTS 5,220,507 A * 6/1993 Kirson ................... G01C 21/34
340/995.19
5,638,280 A * 6/1997 Nishimura ......... G01C 21/3446
340/990
(Continued)

FOREIGN PATENT DOCUMENTS

JP 2007267294 A 10/2007
JP 2008306604 A 12/2008
(Continued)

OTHER PUBLICATIONS

Extended European Search Report dated Oct. 24, 2017 in corresponding European Patent Application No. 17185099.3, 6 pages.
(Continued)

*Primary Examiner* — Alex Kok S Liew
(74) *Attorney, Agent, or Firm* — Carter, DeLuca & Farrell LLP

(57) ABSTRACT

An information processing apparatus that causes a display to display an image captured by one or more image capturing apparatuses is provided. The information processing apparatus obtains one or more pieces of path information indicating a change in a position of an object captured by the one or more image capturing apparatuses, and causes the display to display map information overlapped with the one or more pieces of path information and at least one of information related to a time corresponding to the path information and information that can specify an image capturing apparatus corresponding to the path information.

13 Claims, 9 Drawing Sheets

(51) Int. Cl.
*G06F 3/048* (2013.01)
*H04N 7/18* (2006.01)
(52) U.S. Cl.
CPC ..... *G06K 9/00342* (2013.01); *G06K 9/00771* (2013.01); *H04N 7/188* (2013.01); *G06T 2207/30196* (2013.01); *G06T 2207/30232* (2013.01); *G06T 2207/30241* (2013.01)

(56) References Cited

U.S. PATENT DOCUMENTS

| | | | | |
|---|---|---|---|---|
| 6,418,373 | B1* | 7/2002 | Omi | G01C 21/3484 |
| | | | | 340/990 |
| 9,621,857 | B2 | 4/2017 | Mayuzumi | |
| 2003/0053659 | A1* | 3/2003 | Pavlidis | G06K 9/00335 |
| | | | | 382/103 |
| 2006/0222209 | A1* | 10/2006 | Zhang | G06K 9/00771 |
| | | | | 382/107 |
| 2008/0170751 | A1* | 7/2008 | Lei | G06T 7/215 |
| | | | | 382/103 |
| 2008/0304706 | A1 | 12/2008 | Akisada et al. | |
| 2010/0033302 | A1* | 2/2010 | Yamamoto | G06K 9/00771 |
| | | | | 340/5.82 |
| 2010/0045799 | A1* | 2/2010 | Lei | G06K 9/00369 |
| | | | | 348/169 |
| 2011/0249861 | A1* | 10/2011 | Tokutake | G06F 17/3079 |
| | | | | 382/103 |
| 2016/0028951 | A1 | 1/2016 | Mayuzumi | |

FOREIGN PATENT DOCUMENTS

| | | |
|---|---|---|
| JP | 2009-265922 A | 11/2009 |
| JP | 2015019250 A | 1/2015 |
| JP | 2015153054 A | 8/2015 |
| KR | 10-2013-0130544 A | 12/2013 |
| WO | 2014050432 A1 | 3/2014 |
| WO | 2014/122884 A1 | 8/2014 |

OTHER PUBLICATIONS

Notification of Reason for Refusal issued by the Korean Intellectual Property Office dated Feb. 6, 2020 in corresponding Korean Patent Application No. 10-2017-0100843, with English translation.
Japanese Office Action for application No. 2016163038 dated Mar. 6, 2020 with English Translation.

* cited by examiner

INFORMATION PROCESSING APPARATUS, METHOD THEREOF, AND COMPUTER-READABLE STORAGE MEDIUM

BACKGROUND OF THE INVENTION

Field of the Invention

The present invention relates to an information processing apparatus, a method thereof, and a computer-readable storage medium.

Description of the Related Art

In a monitoring system using a plurality of cameras such as that used in a store, captured images of the plurality of cameras are displayed in a multi-screen setting, and a monitor visually confirms these images. These images are saved in a device such as a recorder, and when a problem such as an incident occurs, the images are played back by specifying the corresponding cameras from the time information, the place information, and the like.

There is also known a system having an arrangement in which a plurality of cameras and infrared sensors are installed for the purpose of pedestrian traffic analysis in a store in addition to the monitoring purpose described above. In such a system, a traveling path is displayed as statistical information on a map by detecting the movements of people by cameras and sensors and analyzing the detection result.

However, since these systems are independent systems, for example, the image of an actual person corresponding to a traveling path on a map cannot be displayed and visually confirmed in the system for the purpose of pedestrian traffic analysis.

As a system which uses the traveling path and the image of a person in cooperation, Japanese Patent Laid-Open No. 2009-265922 discloses an arrangement that performs face authentication and records how a person specified by face authentication has moved in a monitoring area.

However, in the system disclosed in Japanese Patent Laid-Open No. 2009-265922, only a person who has been facially authenticated beforehand and pre-registered is set as a tracking target. Hence, it cannot perform a monitoring operation and an analysis of the traveling paths of people in cooperation when a place, such as a store, where an indefinite number of people come and go is set as a target.

SUMMARY OF THE INVENTION

According to one aspect of the present invention, there is provided an information processing apparatus that causes a display unit to display an image captured by one or more image capturing apparatuses, comprising: a first obtaining unit configured to obtain one or more pieces of path information indicating a change in a position of an object captured by the one or more image capturing apparatuses; and a display control unit configured to cause the display unit to display map information overlapped with the one or more pieces of path information and at least one of information related to a time corresponding to the path information and information that can specify an image capturing apparatus corresponding to the path information.

Further features of the present invention will become apparent from the following description of exemplary embodiments (with reference to the attached drawings).

DESCRIPTION OF THE EMBODIMENTS

Preferred embodiments of the present invention will now be described in detail with reference to the accompanying drawings. Note that the arrangements to be described in the following embodiments are merely examples, and the present invention is not limited to the illustrated arrangements.

(Image Processing System)

Figure 1:
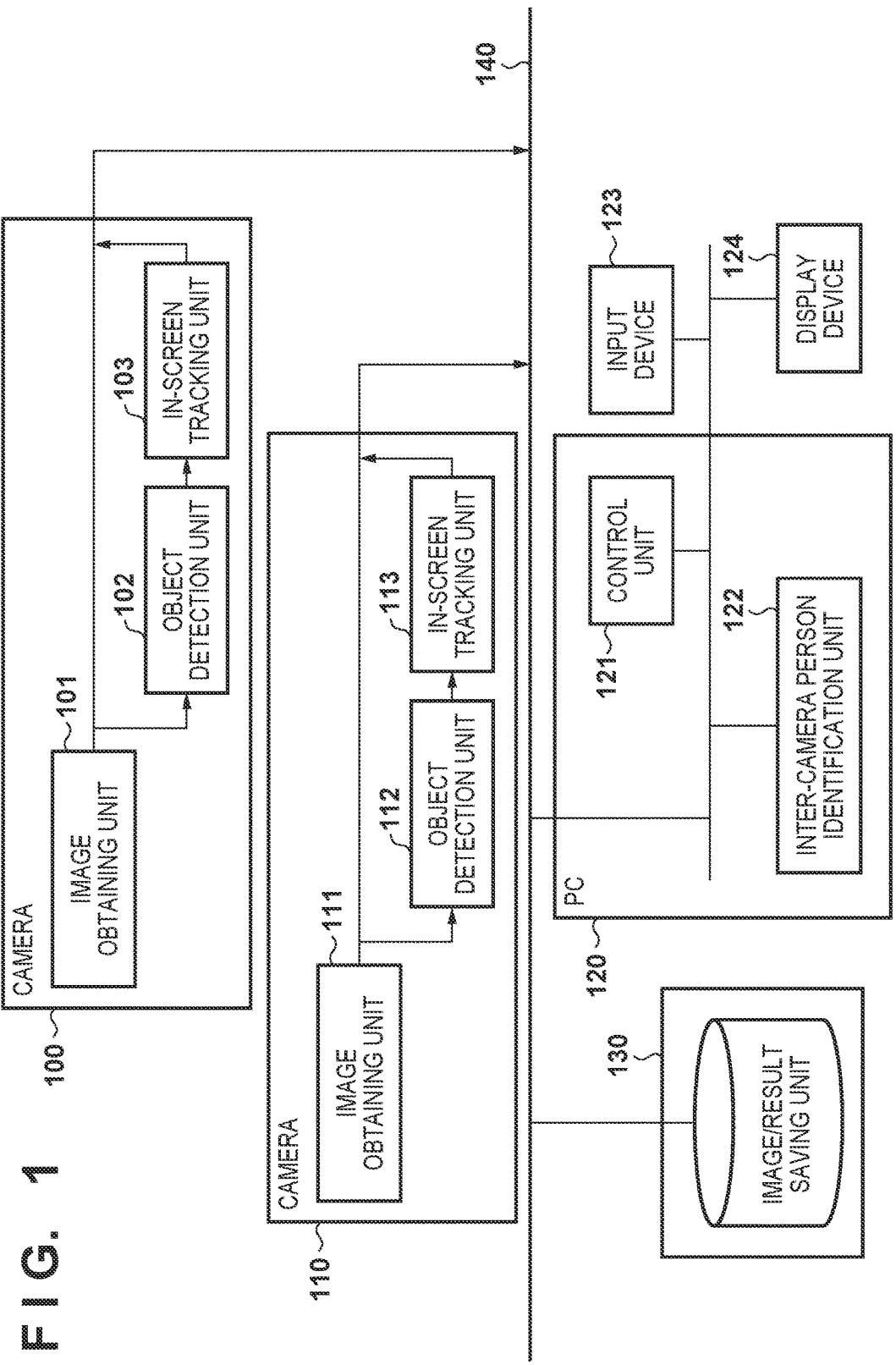
FIG. 1 is a block diagram of the overall arrangement of an image processing system.

An arrangement of an image processing system according to an embodiment of the present invention is shown in FIG. 1. The image processing system includes a plurality of cameras, an image processing apparatus, and a storage device, and these respective components are connected to each other via a network. FIG. 1 shows an example of a system arrangement in which two cameras are used. The number of cameras need not be limited to two, and many cameras may exist. Cameras 100 and 110 which are to capture a monitoring area are set in specific places, respectively, and are connected by a network 140. Inside the camera 100, an image captured in a predetermined frame rate is transmitted onto the network by an image obtaining unit 101 which captures images. Also, an object detection unit 102 detects an object present in the monitoring area from the image obtained by the image obtaining unit 101, and tracking processing of the detected object is performed by an in-screen tracking unit 103. The detection of the object and the result of the tracking processing are transmitted onto the network as metadata related to the image. An image obtaining unit 111, an object detection unit 112, and an in-screen tracking unit 113 having the same respective functions as those described above are also present in the camera 110.

A storage device 130 includes an image/result saving unit that stores images and metadata transmitted from the cameras 100 and 110. The storage device 130 can be present independently on the network or may be present inside an image processing apparatus 120 (to be described later).

Reference numeral 120 denotes an image processing apparatus. The image processing apparatus 120 functions as an information processing apparatus that causes a display device to display an image captured by at least one of the image capturing apparatuses in a predetermined spatial area. The image processing apparatus 120 receives the images and the metadata output from the cameras 100 and 110 or data read out from the storage device 130 and performs internal processing. An input device 123 which accepts an input from a user and a display device 124 which displays a processing result are connected to the image processing apparatus 120. The display device 124 displays a captured image received from each camera and an image saved in the storage device 130. Other than the images, the display device also displays a map (map information) of a monitoring area, a traveling path of a person who has moved in the monitoring area, and the like. The traveling path of a person can be processed by an inter-camera person identification unit 122 in the image processing apparatus 120. The inter-camera person identification unit 122 performs person identification between cameras based on the tracking result processed by each camera, the person information, the angle of view, and the physical arrangement of each camera, and the like, and calculates the traveling path of the target person. Although the inter-camera tracking processing is processed by each of the cameras 100 and 110 in FIG. 1, object detection and in-screen tracking may be performed in the image processing apparatus 120 based on images obtained from the respective cameras. A control unit 121 that controls the above-described processes is present in the image processing apparatus 120. The image processing apparatus 120 is implemented by a general-purpose information processing apparatus such as a personal computer (PC) or a tablet terminal, or a specific-purpose information processing apparatus such as an embedded device.

The network 140 is implemented by a communication medium such as Ethernet® or the like. However, the present invention is not limited to this, and the network can be implemented by any wired or wireless medium capable of transmitting information. The network 140 is also not limited to a dedicated network and may be implemented by a communication network via a public communication network such as the Internet.

(Hardware Arrangement of Image Processing Apparatus)

Figure 2:
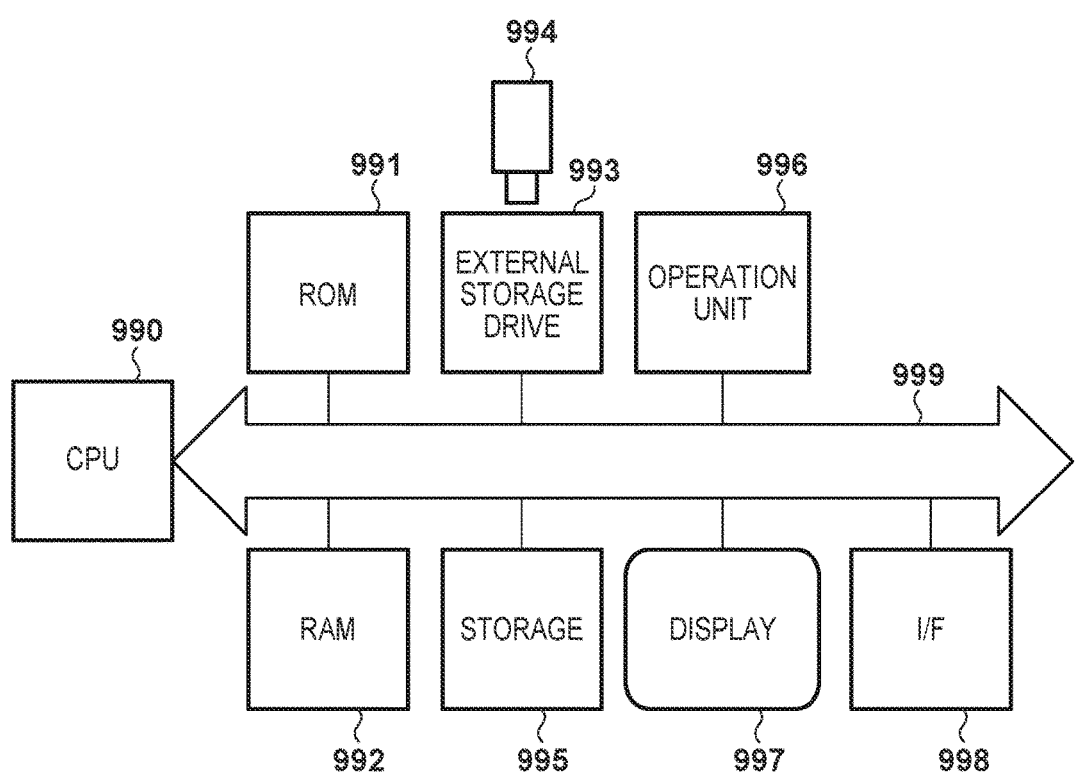
FIG. 2 is a block diagram showing the hardware arrangement of an image processing apparatus.

FIG. 2 is a block diagram showing an example of the hardware arrangement of the image processing apparatus 120 according to this embodiment. The image processing apparatus 120 is, for example, implemented by a personal computer (PC), an embedded system, a tablet terminal, a smartphone, or the like.

In FIG. 2, a CPU 990 is a central processing unit and controls the overall operation of the image processing apparatus 120 by cooperating with other components based on computer programs. A ROM 991 is a read-only memory and stores basic programs and data used for basic processing. A RAM 992 is a random access memory and functions as a work area for the CPU 990.

An external storage drive 993 implements access to a storage medium and can load, to the main system, computer programs and data stored in a medium (recording medium) 994 such as a USB memory. A storage 995 is a device that functions as a large-capacity memory such as a hard disk (HD) or a solid-state drive (SSD). The storage 995 stores various kinds of computer programs and data. Although the storage device 130 is implemented by the storage 995 in this embodiment, it may be implemented by a cloud or network storage.

An operation unit 996 is a device that accepts command inputs and instructions from the user and corresponds to a keyboard, a pointing device, a touch panel, and the like. The input device 123 is implemented by the operation unit 996.

A display 997 is a display device that displays a command input from the operation unit 996, a response output from the image processing apparatus 120 to the command, and the like. The display device 124 is implemented by the display 997. An interface (I/F) 998 is a device which relays the exchange of data with an external device. A system bus 999 is a data bus in charge of the data flow in the image processing apparatus 120.

Note that software capable of implementing a function corresponding to that of each above-described device may be arranged as an alternative to each hardware device.

(Monitoring Area Map)

Figure 3:
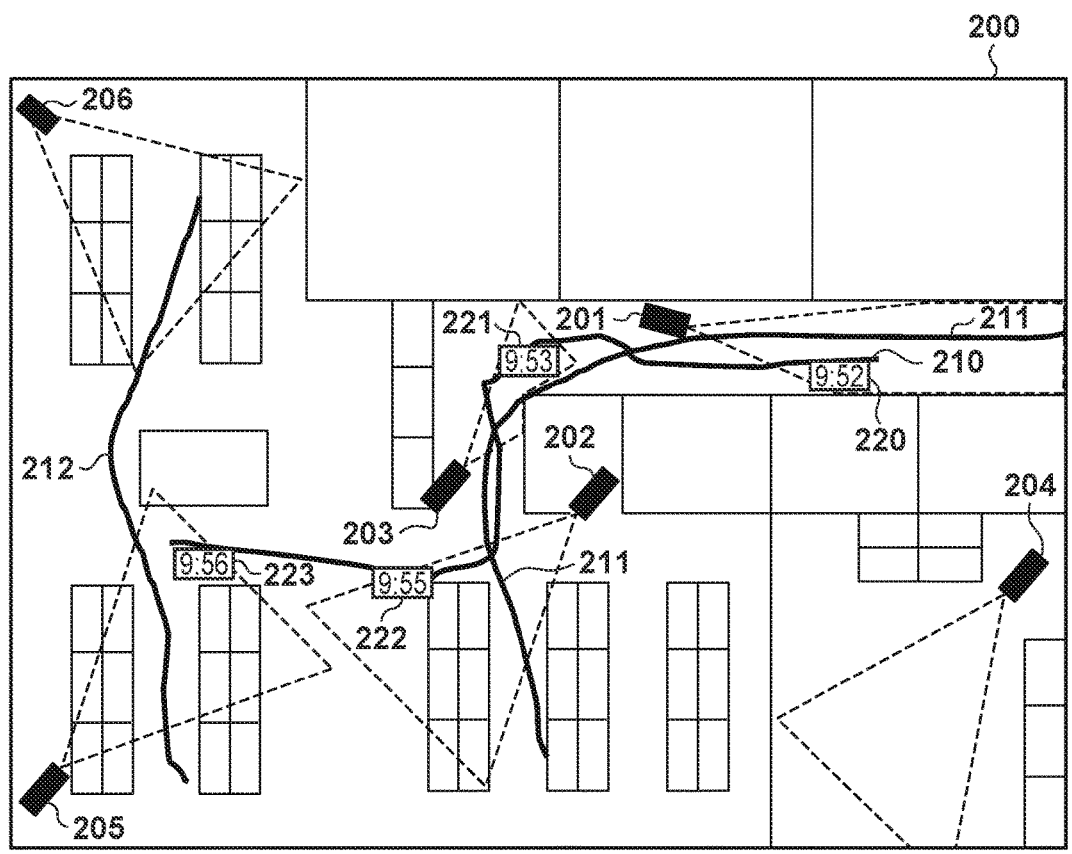
FIG. 3 is a view showing an example of a monitoring area map and traveling paths that are to be displayed on a display device.

FIG. 3 is an example of a monitoring area map which is to be displayed on the display device 124. This map shows the physical arrangement of the monitoring area, the arrangement of the cameras, and the traveling paths of detected persons. A map 200 shows a monitoring area map, and a drawing of the division of rooms, the arrangement of desks, and the situation of partitions is displayed on the map. The monitoring area map may be saved in the image processing apparatus 120 or be saved in the image/result saving unit of the storage device 130. The arrangement of the cameras installed in the monitoring area and the approximate angles of view are shown on the map 200. Six cameras are used in the monitoring area, and the cameras are installed in places indicated by reference numerals 201 to 206, respectively. Furthermore, the approximate angle of view of each camera has been indicated by a corresponding broken line. Traveling paths 210, 211, and 212 of a person who has been detected in the monitoring are also displayed on the map. Each traveling path is calculated and displayed by the inter-camera person identification unit 122 in the image processing apparatus 120 based on the detection of the object processed in each camera, each tracking processing result, and the physical arrangement, the angle of view, and the person information of each camera. Time labels 220, 221, 222, and 223 have been added to the traveling path 210. These labels can be added automatically when a traveling path is to be displayed or can be displayed when a traveling path has been selected (to be described later). Since each traveling path holds time information, it is possible to distinguish a past traveling path and a current traveling path from each other by distinguishing the colors or the line types of the displayed traveling paths. Note that if the object has been continuously tracked from a predetermined time to the current time, the traveling path corresponding to this tracking result is the current traveling path. That is, the current traveling path is a traveling path corresponding to an object that is being captured currently, and the past traveling path is a traveling path corresponding to an object that is not being captured currently. Further, since each traveling path holds correspondence information of a line on the path and each camera which captured the line, it is possible to display the path and the camera in association with each other. For example, the color used to display a camera on the map and the line color of the path captured by that camera are displayed using the same color. In this manner, the traveling paths, the corresponding cameras, and time information can be associated and displayed on the display device 124.

For example, if a monitor thinks that a certain traveling path is suspicious in the monitoring area map of FIG. 3, the monitor designates the traveling path on the map by using the input device 123 of the image processing apparatus 120. Letting traveling path 210 be the designated traveling path, the image processing apparatus 120 next displays, on the display device 124, a map and an image of a corresponding person such as that shown in FIG. 4.

Figure 4:
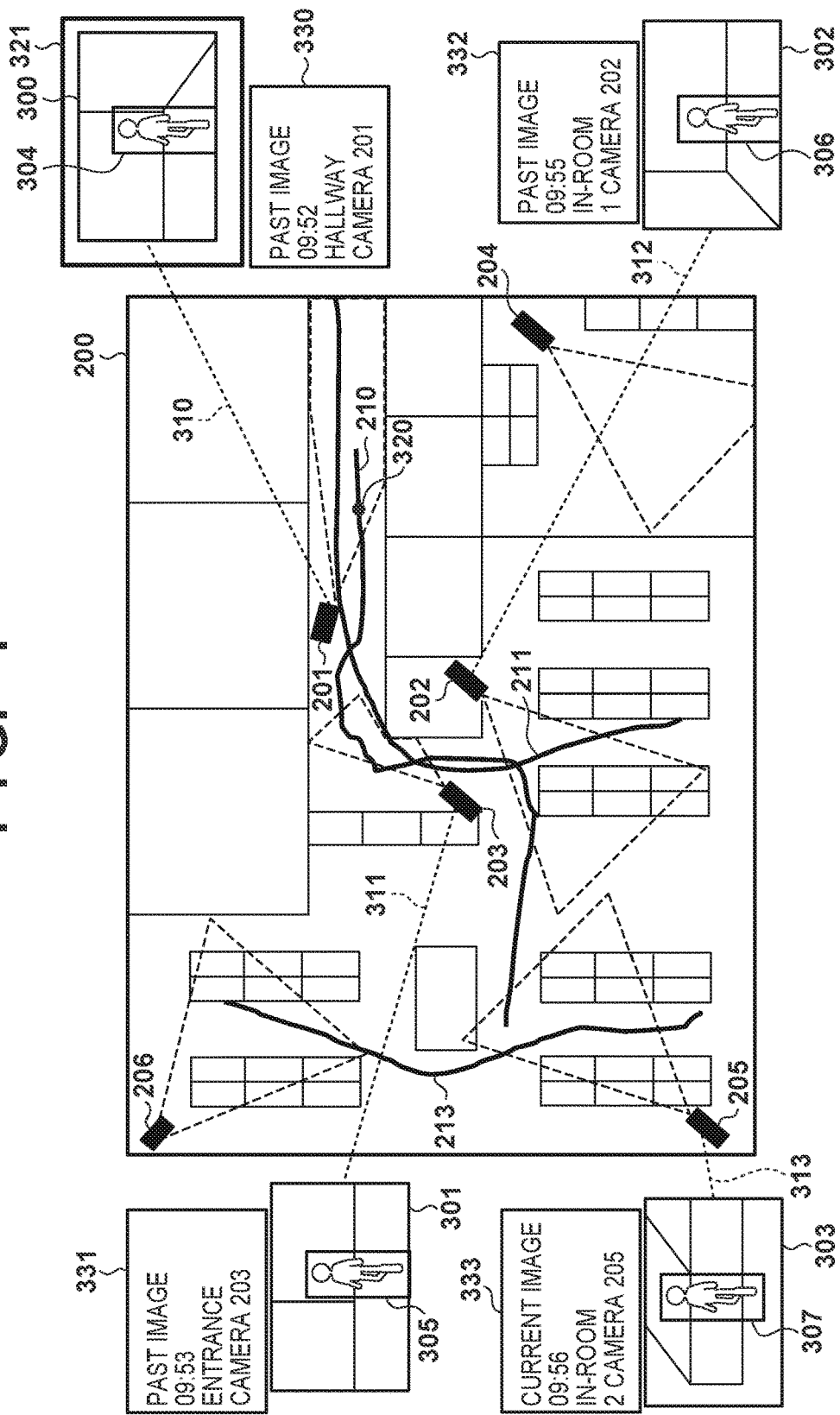
FIG. 4 is a view showing a display example of a current image and past images of an object in correspondence with the respective traveling paths.

FIG. 4 displays the past images of the traveling path 210 and the current captured image in addition to the physical arrangement of the monitoring area, the arrangement of the cameras, and the traveling paths of each detected person that were displayed in FIG. 3. An image 300 displayed on the display device 124 is a past image of a person corresponding to the traveling path 210 which has been captured by the camera 201. The image is stored in the storage device of the storage device 130. In order to clarify that the image 300 has been captured by the camera 201, the image and the corresponding camera are associated and displayed in the manner of a broken line 310. Also, a frame 304 has been added to the image to clarify the target person. In addition, in the manner of information 330, information indicating that the image is a past image, time information, information of the place captured by the camera, and a camera identification number are displayed, and the time information, the camera, and the image of the traveling path are associated and displayed.

In the same manner, an image 301 is a past image of the person corresponding to the traveling path 210 captured by the camera 203. A broken line 311 associating the image 301 and the camera 203 and a frame 305 clarifying the target person in the image 301 are displayed. Also, as indicated by 331, information associated with the camera information and the time information of the image is displayed. An image 302 is a past image captured by the camera 202. A broken line 312 associating the past image 302 and the camera 202 and a frame 306 clarifying the target person are displayed. Also, as indicated by 332, the time information and the camera information are displayed. Additionally, in FIG. 4, if the target person corresponding to the traveling path 210 is present in the monitoring area at that current time, not only the past images stored in the storage device 130, but also the current image captured by the camera is displayed. For example, a time when a traveling path display is displaying a person who is currently present is such a case. An image 303 is the current image captured by the camera 205. A broken line 313 for associating the camera 205 and the image 303 and a frame 307 for clarifying the target person are displayed. In addition, as indicated by 333, the time information and the camera information are displayed.

Furthermore, the image 303 can be displayed not only as a still image but also as a moving image, and moving image display is performed while the person is being captured by the camera in the monitoring area at that current point of time. Also, for example, if the camera 205 is a camera which has a pan-tilt function, tracking using the pan-tilt function can be started.

An example has been described in which an image from each camera which captured the person corresponding to the designated traveling path 210 is displayed together with a map. Each past image which is to be displayed need not only be a still image but may also be a moving image or continuous still images. For example, when continuous still images are to be played back in accordance with the time, a position indicator 320 synchronized with the playback time is displayed on the traveling path 210. Also, in order to allow the user to pay attention more easily to an image window performing continuous playback, the image window is highlighted as indicated by 321. If the position indicator 320 is present within the area of the capturing angle of view of the camera 201, images are continuously displayed as indicated by 300. After the images to be displayed in the images have been continuously displayed as indicated by 300, images in which the target person is present in the range of the capturing angle of view of the camera 203 are continuously displayed in the window of the image 301. At this time, the position indicator 320 is displayed in a position synchronized with each image to be displayed.

As described above, this embodiment displays map information overlapped with at least one traveling path and at least one of information related to a time corresponding to each traveling path (path information) displayed on the map information and information that can specify each image capturing apparatus corresponding to each traveling path. Hence, the user can grasp the correspondence relationship between each traveling path, the time, and the image capturing apparatuses at a glance. Additionally, display control of displaying a captured image is performed by obtaining, in accordance with the selection of the traveling path displayed on the map information, a captured image of an object corresponding to the selected traveling path. Hence, monitoring can be effectively performed by causing the monitoring operation and the display of the traveling paths on the map to cooperate so that, for example, an image of an object that has made a suspicious movement (path) can be immediately confirmed. In addition, the user can easily grasp the correspondence relationship between a person set as the object and each captured image by displaying the position indicator 320 of the person, highlighting the captured image of the person, and displaying the frame of the target person in the captured image cooperatively.

(Processing Function Blocks)

Figure 5:
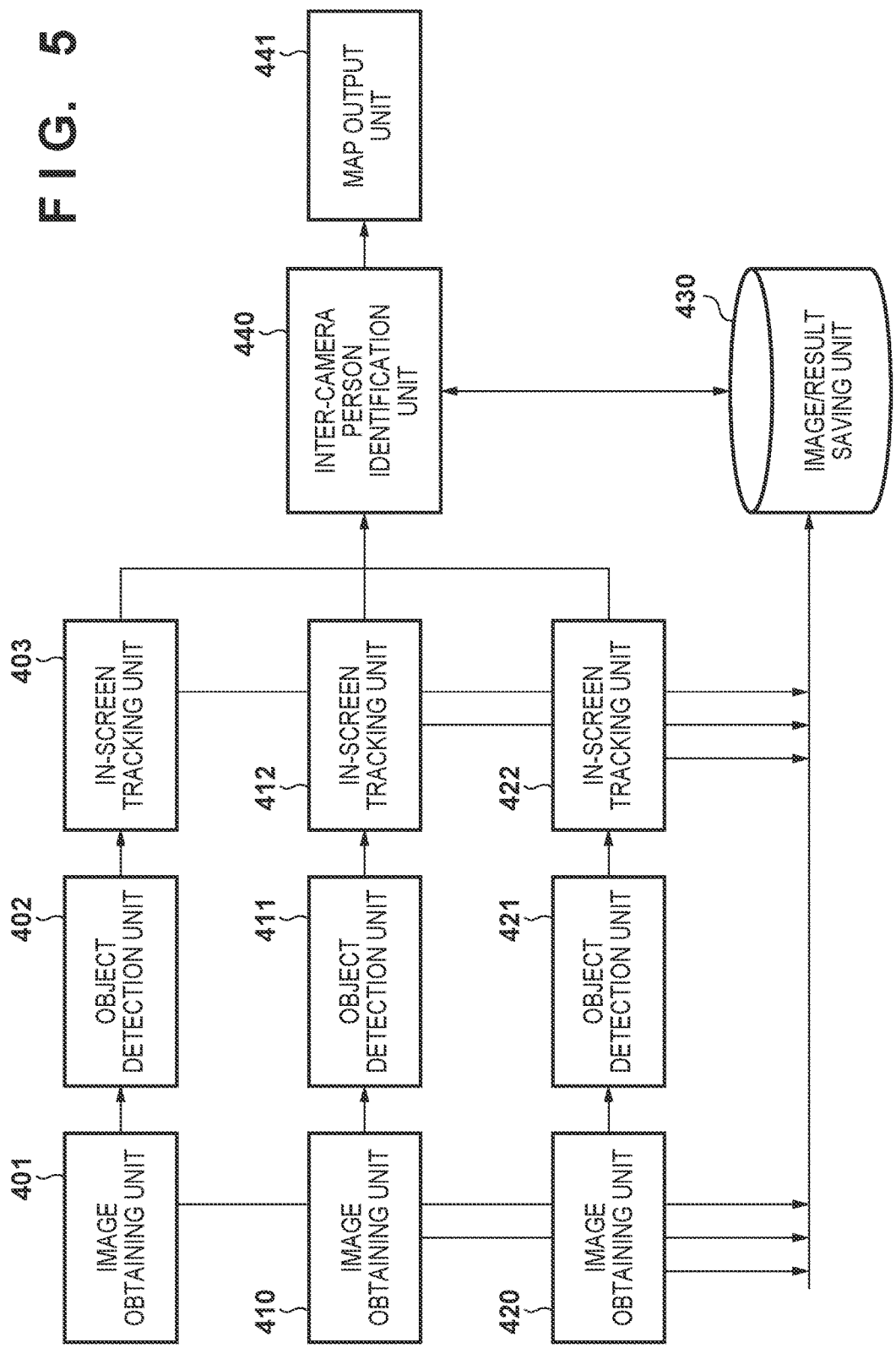
FIG. 5 is a block diagram showing the processing procedure performed until a map is displayed.

FIG. 5 is a block diagram showing the functional arrangement of processing until the map and each traveling path of a person are displayed on the display device 124.

FIG. 5 shows an example in which three cameras are used. An image obtaining unit 401 sequentially obtains images at a predetermined frame rate. Each image is, while being subsequently transmitted to an object detection unit 402, transmitted to an image/result saving unit 430 and saved together with the corresponding time information and the camera type information. In the object detection unit 402, a moving object is detected by background subtraction or a person is detected by human body detection. These detected objects are transmitted to an in-screen tracking unit 403, and tracking information is generated. The generated tracking information is saved in the image/result saving unit 430 and also transmitted to an inter-camera person identification unit 440. The above-described image obtaining unit 401, the object detection unit 402, and the in-screen tracking unit 403 may be implemented in one camera such as that shown in FIG. 1. In addition, only image obtainment may be performed in the camera, and object detection and the in-screen tracking processing may be performed in an apparatus (for example, the image processing apparatus 120) outside the camera. Here, as one example, a method of performing processing in the camera until the in-screen tracking processing will be described below.

In the same manner as described above, the respective processes of an image obtaining unit 410, an object detection unit 411, and an in-screen tracking unit 412 are performed in the second camera. In the third camera, processes are performed by an image obtaining unit 420, an object detection unit 421, and an in-screen tracking unit 422, respectively. Also in the internal processing of each of the second and the third cameras, images and tracking results are saved in the image/result saving unit in the storage device 130, and each tracking result is transmitted to the inter-camera person identification unit 440.

In the inter-camera person identification unit 440, the in-screen tracking information received from each camera and the tracking information saved in the image/result saving unit 430 are used to associate the identical objects between the cameras. In order to make an association, time information and information obtainable from an image, such as the characteristics of the face or the entire body of the object, are used to identify the target. In a case in which there are distances between the respective cameras, association is performed by predicting the movement of the object. As a result, the traveling path of an object detected by a plurality of cameras can be obtained.

Each traveling path is associated with the time information and the information of the camera which has captured an image. These pieces of information and each traveling path obtained by inter-camera person identification are saved in the image/result saving unit 430 together with person information such as the ID of the target person. Furthermore, to indicate each traveling path on the map displayed on the display device 124, drawing display processing is performed on the map by a map output unit 441. In the map display, since each traveling path includes time information, it is possible to distinguish and display whether the traveling path is past information or current information. In addition, since the camera identification information is also held, it is possible to distinguish and display which of the cameras has captured a section of the traveling path.

As described above, in this embodiment, an object is detected from an image which has been captured by one or more image capturing apparatuses, and the detected object is tracked in the captured image. Then, person identification of the tracked object is performed between the one or more image capturing apparatuses to generate a traveling path (path information). Hence, path information can be generated by associating the path information and the object without requiring a pre-registration operation such as pre-registering an object image.

Additionally, in this embodiment, in a case in which the positions of the tracked object are not continuous, path information is generated by predicting the path of the discontinuous portion based on the positional relationships of the image capturing apparatuses. Hence, even in a case in which there is a place that is a blind spot for the monitoring cameras in the monitoring area and the object has moved to this place, path information can be generated in the form of a continuous path. Note that the prediction of path information can be performed based on the time from when the object has left an image capturing area until he/she has re-entered the image capturing area or the respective places where the object left the image capturing area and re-entered the image capturing area. Note also that it is possible to prevent erroneous analysis of monitoring information by displaying the predicted path information so that it is distinguished from the path information obtained by the capturing operation of the image capturing apparatuses.

(System Operation)

Figure 6:
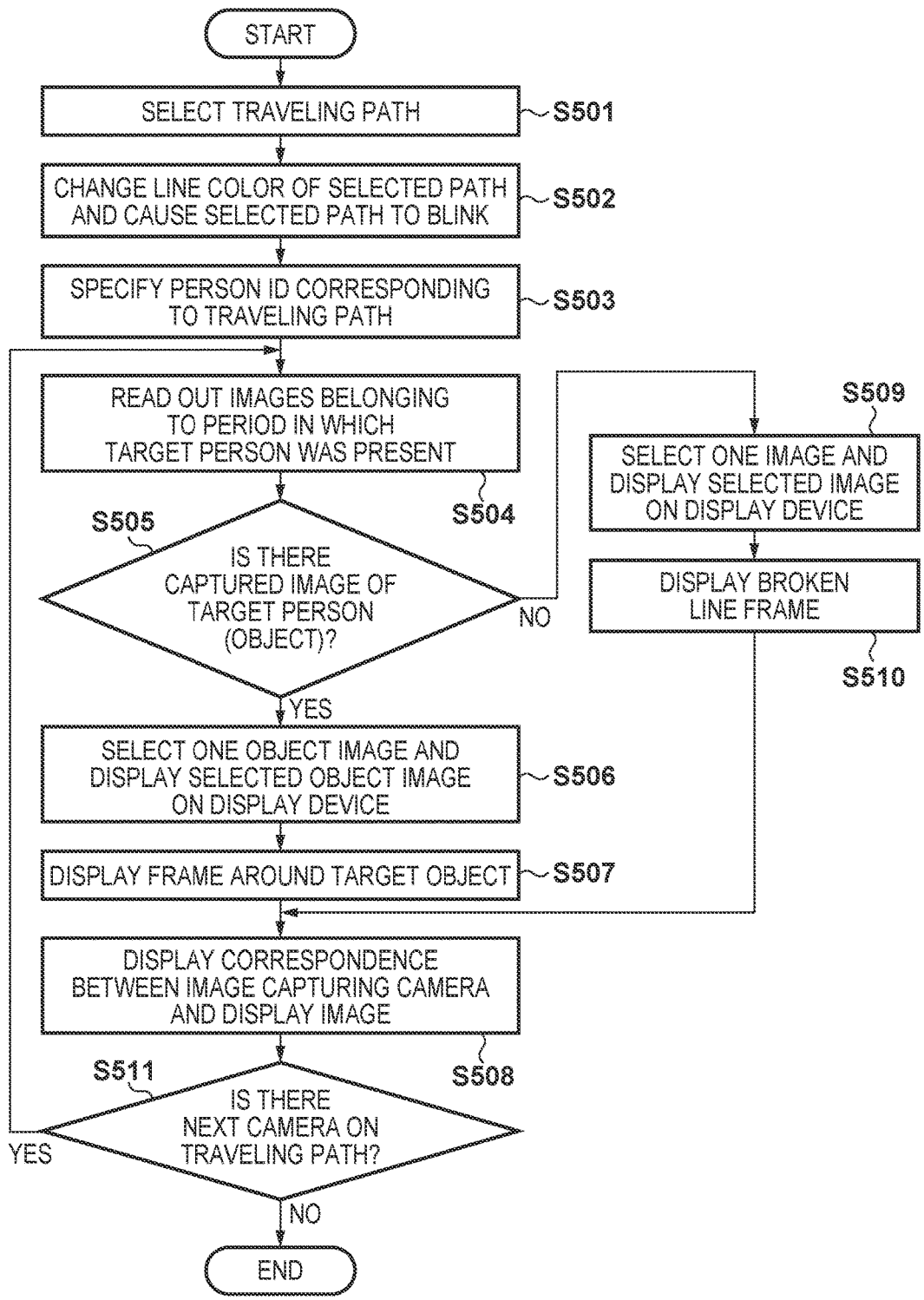
FIG. 6 is a flowchart showing the processing procedure from the selection of a traveling path until the display of an image.

The system operation will be described below with reference to each flowchart. FIG. 6 is a flowchart showing an operation procedure from when a traveling path displayed on the display device 124 is selected until a past image is displayed. Each step of FIG. 6 is executed under the control of the CPU 990.

In the display device 124, a monitoring area map such as that shown in FIG. 3 and the traveling paths of a detected object have been displayed. In step S501, the user uses the input device 123 to select one traveling path. In accordance with this operation, the control unit 121 in the image processing apparatus 120 performs processes such as changing the line color and causing the line to blink so that the selected path can be easily recognized (step S502). Next, the control unit 121 reads out the person information corresponding to the selected traveling path and specifies the corresponding person ID (step S503). The control unit 121 calculates, from an image captured by one camera on the selected path, the period in which the target person was captured based on the traveling path information and reads out images corresponding to this period from the image/result saving unit of the storage device 130 (step S504).

Next, the control unit also obtains the metadata synchronized with the images and determines whether there are images in which the target object has been actually captured among the readout images (step S505). If there are images in which the target object has been captured (YES in step S505), the control unit selects one of the images in which the target has been captured and displays the selected image on the display device 124 (step S506). At the same time, the control unit displays a frame around the target object captured in the selected image and performs a display operation so that the target object can be easily recognized by the user even in case in which other objects have been captured in the image as well (step S507). Subsequently, the process advances to step S508.

On the other hand, in the determination of step S505, if there is no image in which the target object has been captured (NO in step S505), such as a case in which the object is hidden behind another object or a person, the control unit selects one image of the target period and displays the selected image on the display device 124 (step S509). At this time, a broken line frame is displayed at the place at which the target object could be present and displays that the target object could not be recognized (step S510). Subsequently, the process advances to step S508.

In step S508, the control unit 121 performs a display so that the association between the displayed image and the image capturing camera will be easily recognized by the user. The display may be performed by using a method of connecting the image and the camera position on the map with a line or by displaying the time information, the camera position information, the camera identification information, and the like near the image.

Next, the control unit 121 determines whether there is a camera that has not displayed an image yet among the other cameras on the path. If there is a camera that has not displayed an image (YES in step S511), the process returns to step S504. The processing is ended when there is no camera that has not displayed an image (NO in step S511) as a result of the aforementioned processes being performed on every camera on the path. Image display on the traveling path, such as that shown in FIG. 4, is performed consequently by the above-described operation.

As described above, in this embodiment, at least one piece of path information indicating the positional change of the object in a spatial area is obtained, and the display device is caused to display the path information selectably. Then, the display device is caused to display the map information in which at least one piece of path information has been overlapped and at least one of the information related to the time corresponding to path information and the information that can specify each image capturing apparatus corresponding to path information. As a result, the user can grasp the correspondence relationship between the path information and the corresponding time or each image capturing apparatus. Here, as information related to the time corresponding to the path information, information indicating an image capturing time can be displayed for a path which has been captured in the past and information indicating that a traveling path is the traveling path corresponding to an object which is being currently captured can be displayed for a path which is being currently captured.

Also, in this embodiment, a captured image of the object corresponding to the path information is obtained in accordance with the selection of one piece of path information, and the display device is caused to display the obtained captured image. Hence, the user can grasp the traveling path of the person and the monitoring image in cooperation with each other, thereby allowing crime prevention or obtainment of marketing information to be performed easily. Here, in accordance with the selection of one piece of path information, a plurality of images corresponding to the selected path information can be displayed sequentially, and positions on the path information corresponding to the plurality of images can also be displayed sequentially at this time. As a result, the situation at the time when the object was captured can be effectively reproduced and presented to the user.

In addition, in this embodiment, when a captured image corresponding to the path information is to be displayed while displaying the path information of the object on a map, the captured image is displayed in association with a display indicating the position of the image capturing apparatus which obtained this captured image on the map. Furthermore, display indicating the position of the object in the captured image on the map is displayed. Also, an area occupied by the object in the captured image is highlighted by being surrounded by a frame. Moreover, at least one of the information indicating whether the captured image is an image captured in the past or an image which is being captured currently, the image capturing time, and the information identifying the camera that obtained the captured image is displayed. Therefore, the user can grasp, at a glance, the correspondence relationship between the path information, the captured image, the image capturing apparatus (camera) that obtained the captured image, and the position of the object.

Note that when a time is designated by the user, an indicator indicating the position of the object at that time may be displayed on the map or an image captured at that time may be displayed in association with the position of the object in accordance with the designation. As a result, if an event or the like has occurred at a specific time, the user can trace back to that time and easily perform a monitoring operation of the event retroactively. Also, the above example described a case in which a captured image of the object that has moved on a traveling path is displayed in accordance with the selection of the traveling path. In contrast, however, the traveling path in which the object has moved may be displayed in accordance with the selection of the object in the captured image. Additionally, the selection of an arbitrary point on the path may be accepted, and a captured image corresponding to that point may be displayed in accordance with the selection of that point. The provision of such user interface allows the user to associate the traveling path and each monitoring image and easily perform analysis of the monitoring image.

Figure 7:
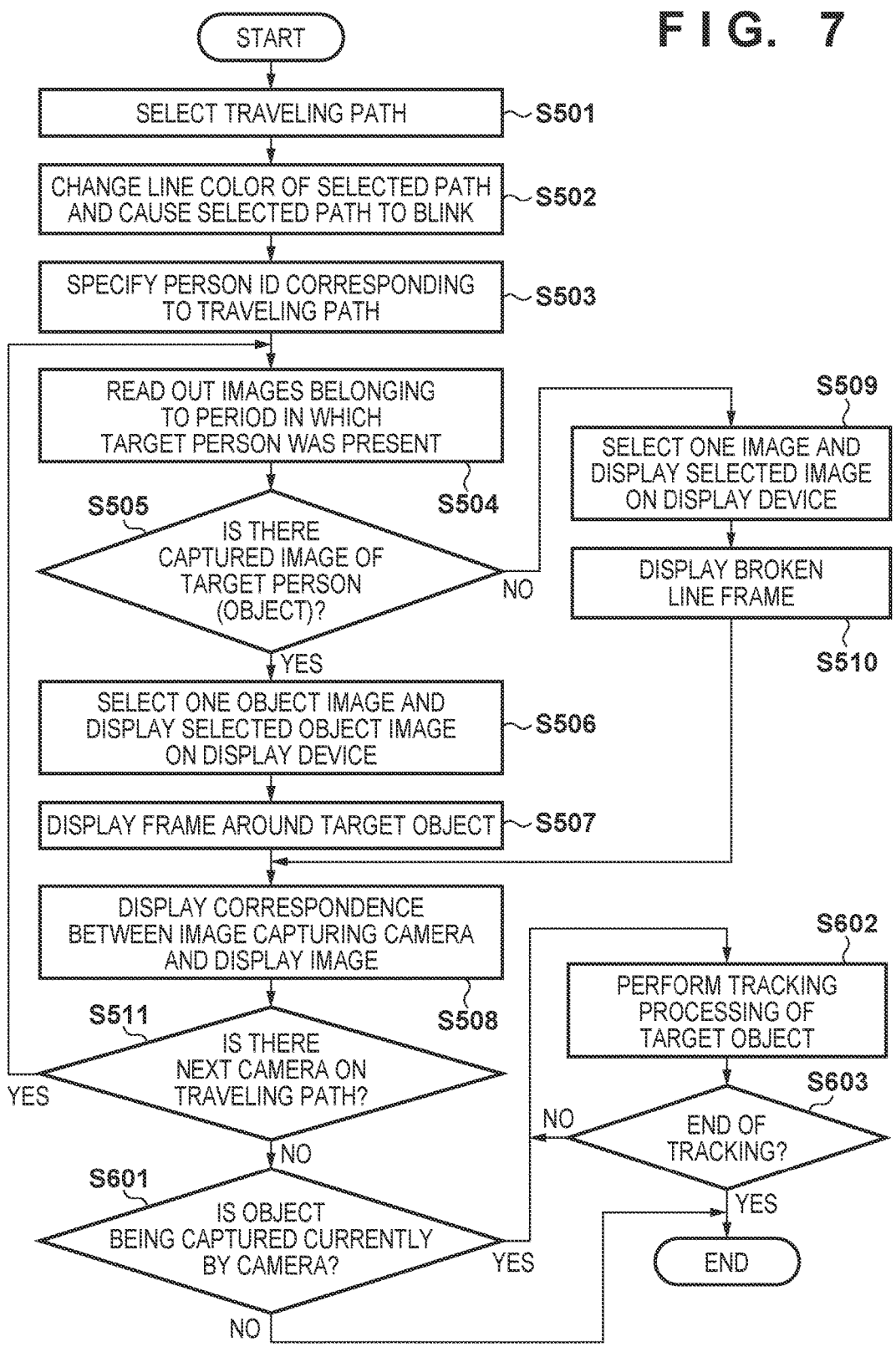
FIG. 7 is a flowchart showing the processing procedure of performing processing to track a current object from image display.

The operation procedure for a case in which the target object is still currently present in the monitoring area will be described next with reference to FIG. 7. FIG. 7 is a flowchart showing the operation procedure for a case in which the tracking processing at the current time is executed when the target object is still currently present in the monitoring area. Each step of FIG. 7 is executed under the control of the CPU 990.

The processes of steps S501 to S511 of FIG. 7 are the same as those of steps S501 to S511 of FIG. 6, and a detailed description thereof will be omitted. In step S511, when the still image display processing has ended for all of the cameras on the path (NO in step S511), the control unit 121 determines whether the target object is still being captured currently in the monitoring area (step S601). This determination is performed by referring to the position of the end of the path, the time, and the metadata transmitted from a camera positioned near the end of the path and determining whether the target object is being captured. If the target object is not being captured (NO in step S601), the operation procedure of the FIG. 7 is ended.

If the target object is being captured (YES in step S601), the control unit 121 receives, from the camera, a camera image capturing the target object and displays the received camera image at a predetermined place on the display device 124 (the image 303 in FIG. 4). The control unit adds a frame to the target object and executes tracking processing of the target object (step S602). The processing ends when the target object has left the monitoring area (step S603). In a case in which the target object is present in the monitoring area, the control unit performs the inter-camera person identification processing and continues the tracking processing of the target object. In addition, if the camera which is capturing the target object is a camera that has a pan-tilt function, pan-tilt tracking may be executed in accordance with the instruction of the control unit 121.

As described above, in this embodiment, in a case in which the captured image corresponding to the traveling path is a captured image which is being currently captured, the image capturing apparatus that is capturing the image can be controlled to track the object in the captured image by using at least one of the pan function and the tilt function. Hence, in a case in which an emergency event such as an incident has occurred, it is possible to take necessary security measures and countermeasures by performing real time tracking of a desired object.

Figure 8:
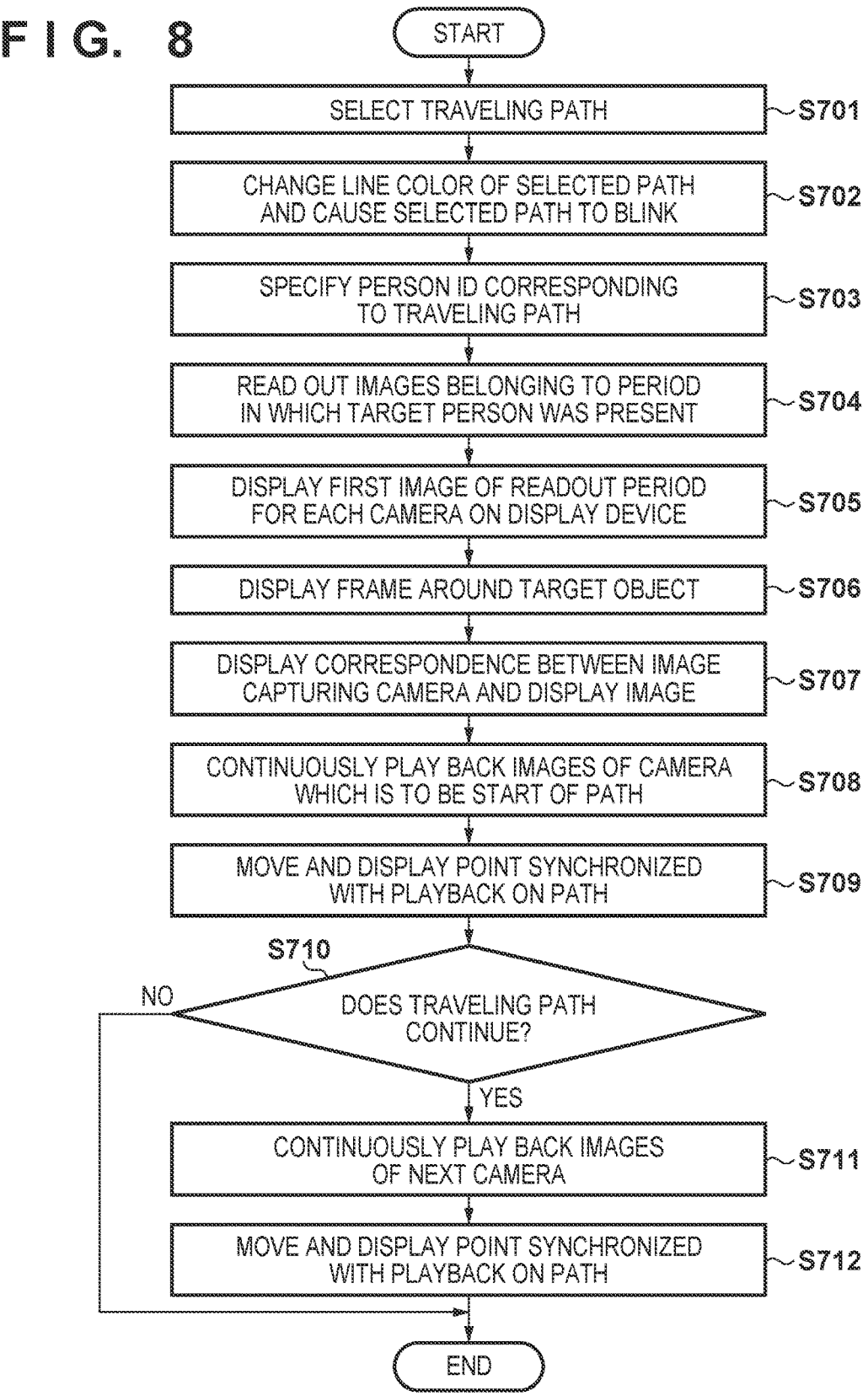
FIG. 8 is a flowchart showing the processing procedure of selecting a traveling path and continuously displaying images.

The example of an operation to display a past still image of the target object has been described above. Next, an operation procedure in a case in which a moving image (continuous still images) is displayed will be described with reference to FIG. 8. FIG. 8 is a flowchart showing the operation procedure when moving image display is performed. Each step of FIG. 8 is executed under the control of the CPU 990. The processing contents of steps S701 to S704 of FIG. 8 are the same as those of steps S501 to S504 of FIG. 6 and those of steps S601 to S604 of FIG. 7 in the case of still image display. Hence, the description and the operation procedure will be simplified, and a detailed description will be omitted.

First, the user selects the traveling path by using the input device 123 (step S701). Next, the control unit 121 changes the color of the line of the selected path and causes the selected path to blink (step S702). The control unit specifies the person ID corresponding to the traveling path (step S703). The control unit 121 reads, for each camera on the traveling path, images belonging to a period in which the object was present from the image/result saving unit in the storage device 130 (step S704).

Next, the control unit displays the first image of the period read out for each camera on the display device 124 (step S705). The control unit also displays a frame around the target object in the displayed image (step S706). At this time, if the target object is hidden in the displayed image or if the target object is not present in the image, a dotted line frame is displayed at a position predicted to be the place where the object is present. Next, the control unit displays the correspondence relationship between the image capturing camera and the displayed image (step S707). Subsequently, the control unit 121 continuously plays back camera images which are to be the start of the path (step S708). In addition, as indicated by 320 of FIG. 4, a point synchronized with the continuously played back images is displayed on the path while moving along the path (step S709).

After the continuous playback of the images of one camera has ended, the control unit determines whether the traveling path continues (step S710). If the traveling path continues (YES in step S710), the control unit 121 performs continuous playback of the images of the next camera (step S711). Also at this time, the control unit moves and displays the point synchronized with the image playback on the path (step S712). The control unit 121 repetitively performs steps S711 and S712 while the traveling path continues. When the traveling path ends (NO in step S710), the processing of FIG. 8 is ended.

As described above, according to the arrangement of this embodiment, it is possible to perform image monitoring of a monitoring area and monitoring of the traveling path of an object. Also, since an image of a target object can be displayed from the traveling path, a more user-friendly monitoring system can be provided.

Figure 9:
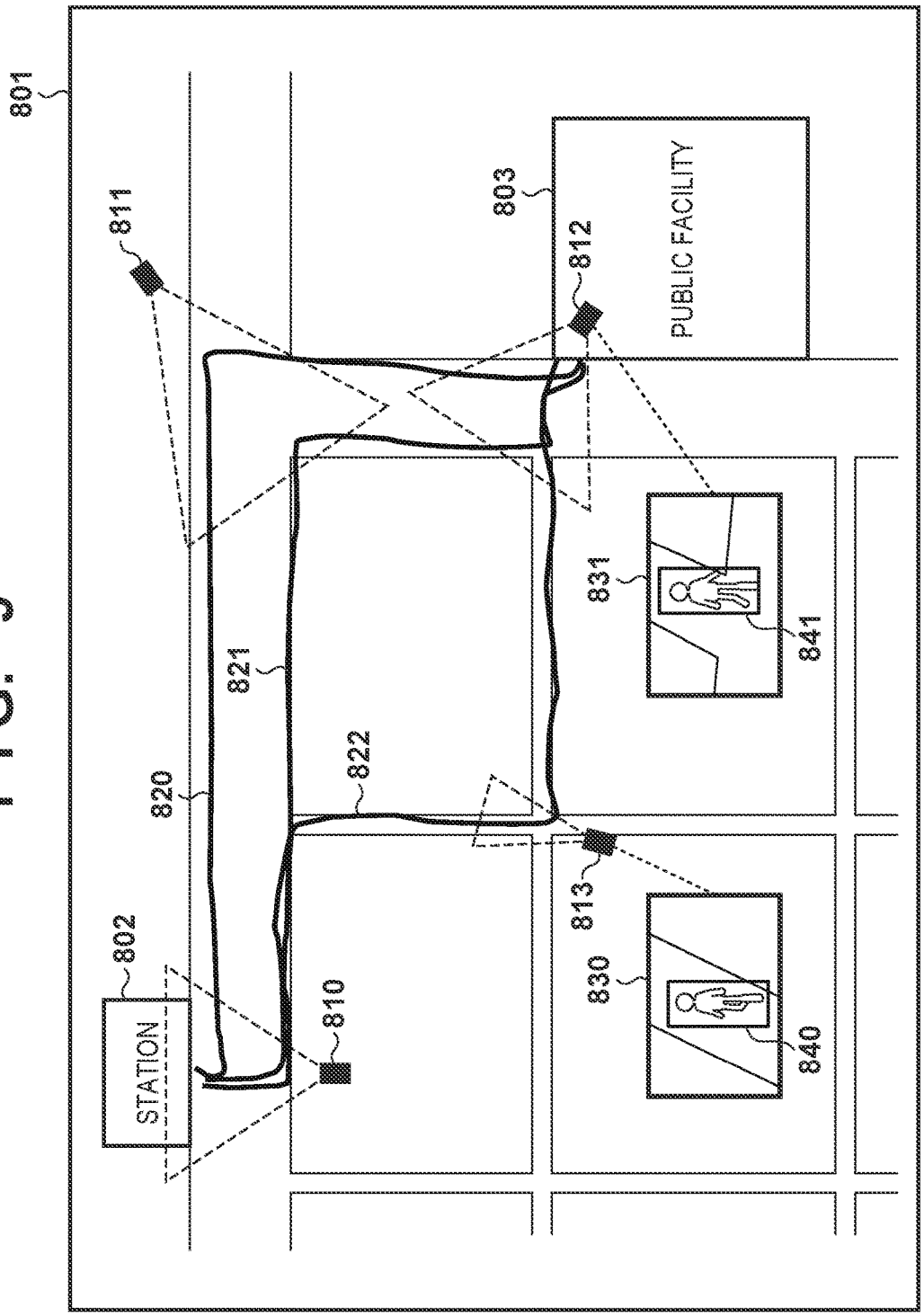
FIG. 9 is a view showing an example in which a wide area has been set as a monitoring target.

FIG. 9 is a view showing an example in which the monitoring area is not limited to the indoors but is set outdoors in a wide area. A map 801 is a map of a monitoring area which is to be displayed on the display device 124. A station 802, a public facility 803, and a map of the streets between them have been displayed on the map. The positions of the four installed cameras and their respective angles of view have been indicated on the map. A camera 810 captures a person coming out of the station. A camera 811 captures an intersection, and a camera 812 captures a person entering the public facility. A camera 813 captures a narrow intersection. In FIG. 9, traveling paths 820, 821, and 822 of the object are displayed. Each of these traveling paths has been obtained by calculating the movement of a person between the cameras by using the time and position information to perform the inter-camera person identification processing. For example, assume that the user wants to specify a person who has used the narrow streets to come to the public facility from the station. The user as the monitor can use the input device 123 of FIG. 1 to select the traveling path 822. Past images of the target object are read out from the image/result saving unit of the storage device 130 based on the operation procedure of FIG. 6, and images are displayed as indicated by 830 and 831 of FIG. 9. Frames 840 and 841 are displayed on the object of the respective images, and it is set so that the target person would be recognizable even if, for example, a plurality of people have been captured in each display image. The user as a monitor can specify the person corresponding to a specific traveling path by these processing procedures.

As described above, according to each embodiment of the present invention, an image processing system that causes cooperation between a traveling path on a map and the image monitoring operations of a plurality of cameras can be provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-163038, filed Aug. 23, 2016, which is hereby incorporated by reference herein in its entirety.

What is claimed is:

1. An information processing apparatus that causes a display to display an image captured by one or more image capturing apparatuses, comprising:

at least one processor; and a memory that is coupled to the at least one processor and stores one or more computer- readable instructions, wherein the computer-readable instructions cause, when executed by the at least one processor, the at least one processor to function as:

an obtaining unit configured to obtain one or more pieces of path information indicating a change in a position of an object on a map and one or more images including the object captured by the one or more image capturing apparatuses;

a detecting unit configured to detect an object from the one or more images captured by the one or more image capturing apparatuses;

a tracking unit configured to track the detected object in the one or more images;

a generating unit configured to generate the path information by performing person identification between the one or more image capturing apparatuses on the tracked object, wherein the generating unit generates, when positions of the object tracked by the tracking unit are not continuous, the path information by predicting a path of a portion which is not continuous based on a positional relationship of the one or more image capturing apparatuses; and a display control unit configured to cause the display to display the one or more pieces of path information and the one or more images including the object captured by the one or more image capturing apparatuses on the map, wherein in accordance with a selection of one piece of path information from among the one or more pieces of path information, the display control unit causes the display to display the one or more images corresponding to the selected one piece of path information from among the one or more pieces of path information.

2. The apparatus according to claim 1, wherein the display control unit causes the display to display, as the information related to the time corresponding to the path information, information indicating an image capturing time.

3. The apparatus according to claim 1, wherein the display control unit causes the display to display, as the information related to the time corresponding to the path information, information indicating a traveling path corresponding to an object that is currently being captured.

4. The apparatus according to claim 1, wherein the display control unit causes the display to display the captured image obtained by a second obtaining unit by associating the captured image with an indicator, on the map information, indicating a position of an image capturing apparatus that captured the image.

5. The apparatus according to claim 1, wherein the display control unit causes the display to display an indicator, on the map information, indicating a position of the object which appears in the captured image obtained by a second obtaining unit.

6. The apparatus according to claim 5, wherein the display control unit causes the display to display, in accordance with the designation of a time, an indicator indicating a position of the object at the time.

7. The apparatus according to claim 1, wherein the display control unit causes the display to highlight and display an area occupied by the object in the captured image obtained by a second obtaining unit.

8. The apparatus according to claim 1, wherein the display control unit causes the display to display, in addition to the captured image obtained by a second obtaining unit, at least one of information identifying a camera that captured the image and an image capturing time, and information indicating whether the captured image is an image captured in the past or is an image being captured currently.

9. The apparatus according to claim 1, wherein the computer-readable instructions further cause, when executed by the at least one processor, the at least one processor to function as:
a control unit configured to control, when the captured image obtained by a second obtaining unit is a captured image which is being captured currently, an image capturing apparatus that is capturing the image such that this image capturing apparatus tracks an object in the captured image by at least one of panning and tilting.

10. The apparatus according to claim 1, wherein the display control unit causes the display to sequentially display a plurality of images including the object corresponding to one piece of path information among the one or more pieces of path information.

11. The apparatus according to claim 10, wherein when the plurality of images are to be sequentially displayed on the display, positions on the path information corresponding to the plurality of images are sequentially displayed on the display.

12. An information processing method that causes display to display an image captured by one or more image capturing apparatuses, comprising:
obtaining one or more pieces of path information indicating a change in a position of an object on a map and one or more images including the object captured by the one or more image capturing apparatuses;
detect an object from the one or more images captured by the one or more image capturing apparatuses;
track the detected object in the one or more images;
generate the path information by performing person identification between the one or more image capturing apparatuses on the tracked object, wherein the generating unit generates, when positions of the object tracked by the tracking unit are not continuous, the path information by predicting a path of a portion which is not continuous based on a positional relationship of the one or more image capturing apparatuses; and
causing the display to display the one or more pieces of path information and the one or more images including the object captured by the one or more image capturing apparatuses on the map,
wherein-the display is caused to display, in accordance with a selection of one piece of path information from among the one or more pieces of path information, the one or more images corresponding to the selected one piece of path information among the one or more pieces of path information.

13. A non-transitory computer-readable storage medium for storing a computer program for causing a computer, which is included in an information processing method that causes display to display an image captured by one or more image capturing apparatuses, to:
obtain one or more pieces of path information indicating a change in a position of an object on a map and one or more images including the object captured by the one or more image capturing apparatuses;
detect an object from the one or more images captured by the one or more image capturing apparatuses;
track the detected object in the one or more images;
generate the path information by performing person identification between the one or more image capturing apparatuses on the tracked object, wherein the generating unit generates, when positions of the object tracked by the tracking unit are not continuous, the path information by predicting a path of a portion which is not continuous based on a positional relationship of the one or more image capturing apparatuses; and
cause the display to display the one or more pieces of path information and the one or more images including the object captured by the one or more image capturing apparatuses on the map,
wherein the display is caused to display, in accordance with a selection of one piece of path information from among the one or more pieces of path information, the one or more images corresponding to the selected one piece of path information among the one or more pieces of path information.

* * * * *